Sept. 30, 1941.    W. W. GARDNER    2,257,459
ATTACHMENT FOR POWER SAWS
Filed Feb. 2, 1939    2 Sheets-Sheet 1
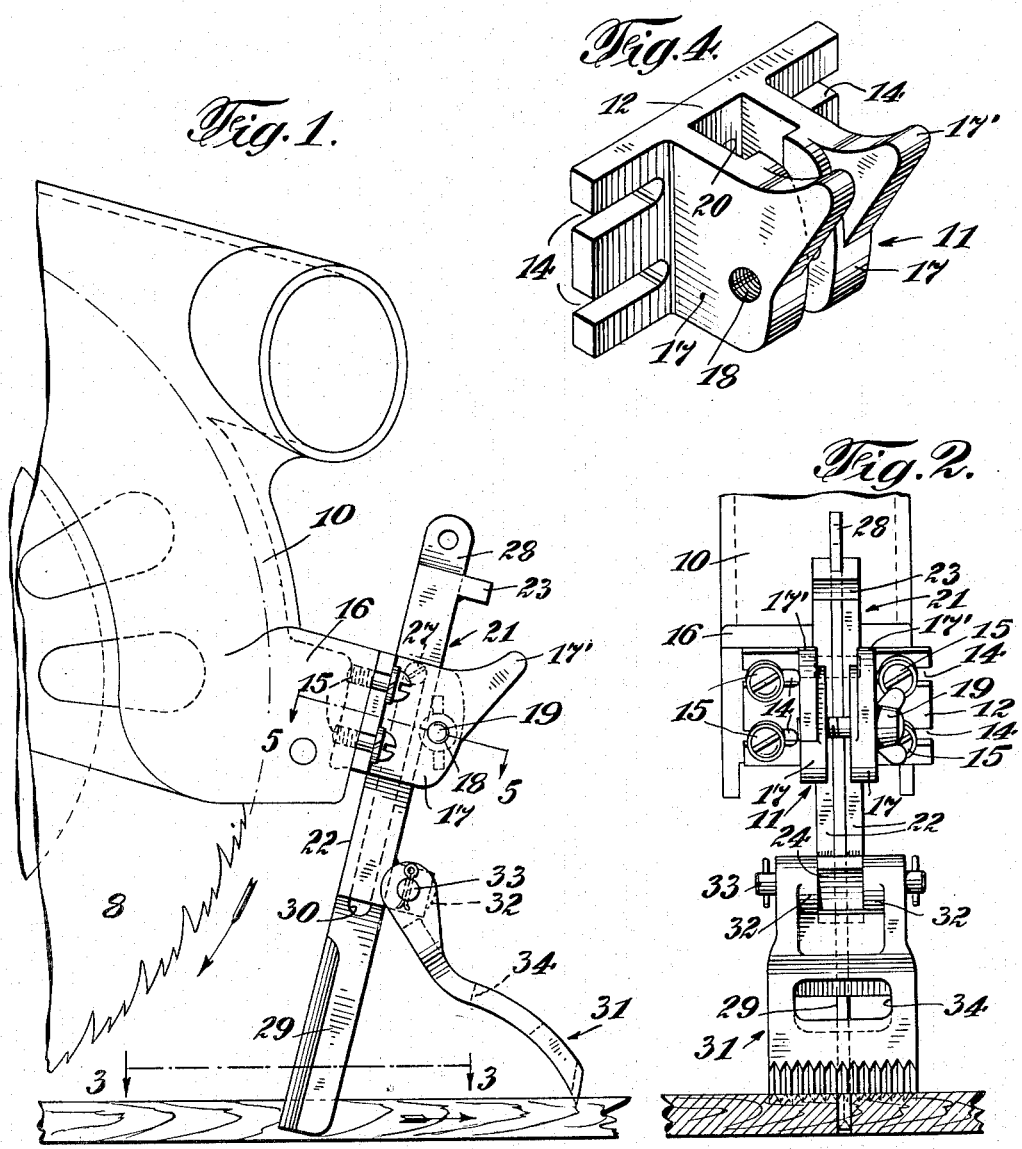
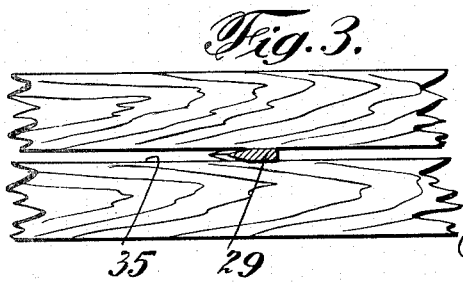
INVENTOR
Wallace W. Gardner
BY
Ramsey, Kent, Chisholm and Lutz
his ATTORNEYS

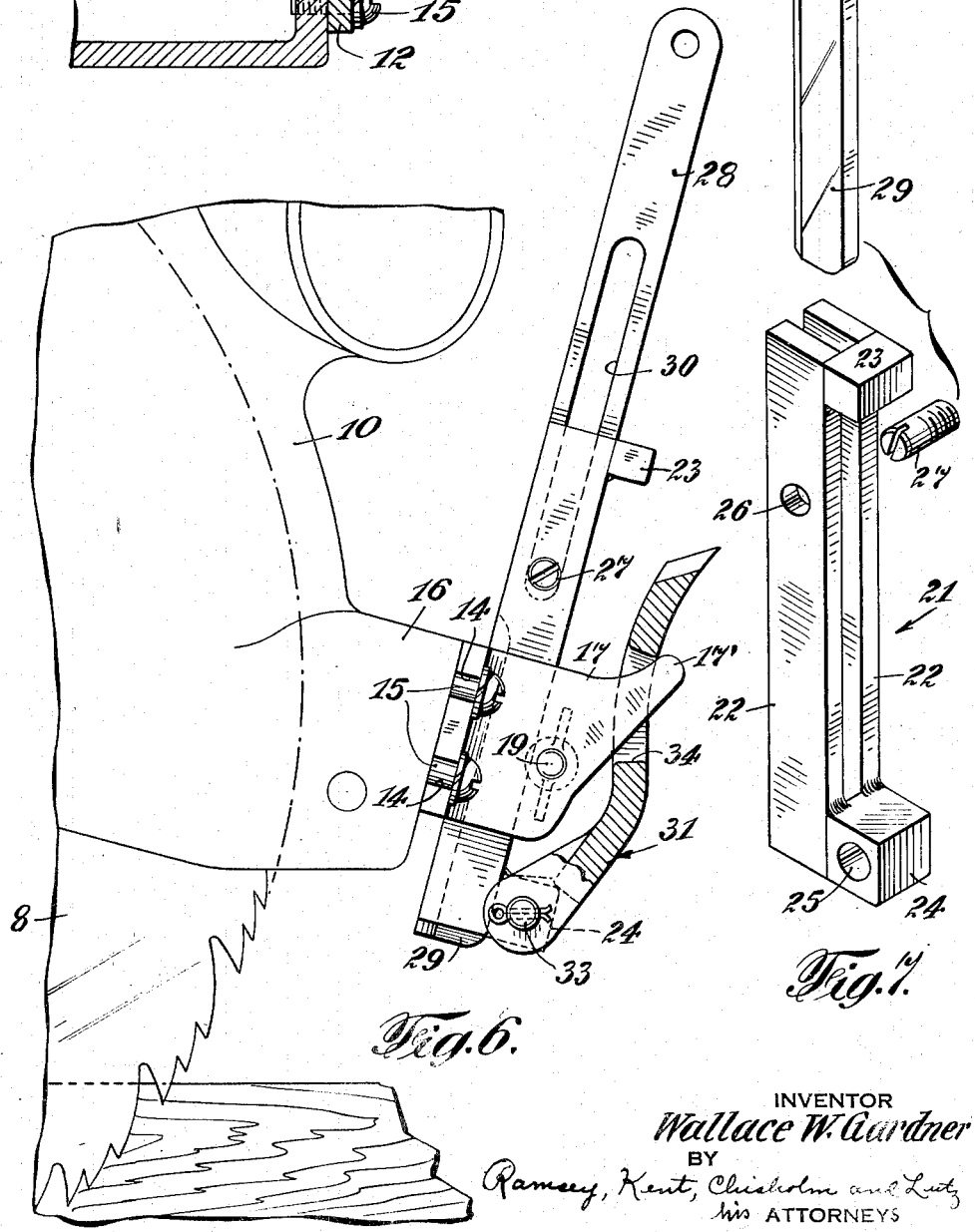

Patented Sept. 30, 1941

2,257,459

UNITED STATES PATENT OFFICE 2,257,459

ATTACHMENT FOR POWER SAWS

Wallace W. Gardner, Lancaster, Pa., assignor to De Walt Products Corporation, Lancaster, Pa., a corporation of Pennsylvania Application February 2, 1939, Serial No. 254,167

9 Claims. (Cl. 143—159)

This invention relates to attachments for power saws of the kind shown, for example, in U. S. Patent No. 1,815,037. Such machines may comprise a motor-driven circular saw, fastened to a table and provided with means for adjusting it to various angular and height relations with respect to the table, so that with the same device various operations may be performed, as ripping, cross-cutting, dadoing, mitering, etc.

A saw of this kind is generally provided with a detachable guard covering enough of its periphery and sides to afford protection to the operator. Preferably in detachable and adjustable association with such guard I propose to mount a "kick-back." The "kick-back" is a device of great protective value in rip-sawing, where the operator shoves a length of lumber under the saw with the latter cutting in a plane perpendicular to the wood and lengthwise thereof. If, as sometimes happens, the saw should take hold of the wood and move it in the direction opposite to that in which it was being pushed by the operator the latter might be injured. Accordingly a "kick-back" is provided to permit normal movement of the wood in the ripping operation, but immediately effective to prevent retrograde movement.

When the saw is to be used for cross-cutting the "kick-back" is not needed, and I therefore provide means whereby it may be held in an ineffective position, but available for use when needed.

I further propose to associate with the "kick-back" a splitter-blade, having the function of keeping open the cleft produced by the saw; and preferably the splitter-blade also is to be adjustably held in its assembly with the "kick-back," so that it may be effective with various thicknesses of lumber and so that it too may be moved to an out-of-the-way position when it is not needed; and there is also provision for alinement of the splitter with the saw.

Other objects and aims of the invention in addition to those suggested above, will appear in the course of the following specification.

In the accompanying drawings, in which I have illustrated an embodiment of the invention as now preferred, Fig. 1 is a side elevation showing the "kick-back" and splitter assembly and their connections to the saw-guard, the latter and the saw-blade and motor being broken away, and parts being in position as required in the ripping operation;

Fig. 2 is an end elevation looking towards the left with respect to Fig. 1;

Fig. 3 is a view taken on the line 3—3 of Fig. 1, showing in section the splitter-blade in section and the ripped lumber in plan and broken away;

Fig. 4 is a perspective showing the bracket whereby the "kick-back" and splitter carrier are secured to the saw-guard;

Fig. 5 is a section taken on the line 5—5 of Fig. 1;

Fig. 6 is a view similar to Fig. 1, but showing parts in the position desirable during the cross-cutting operation, and Fig. 7 is a detail perspective showing the carrier for the "kick-back" and splitter, with the splitter withdrawn.

Referring to the numerals on the drawings, there is shown at 8 the circular saw blade of a familiar type of machine, the saw being driven by motor 9 and shielded by guard 10. A bracket 11 is designed for removable and adjustable attachment to the guard and comprises a backplate 12 having at each end slots 14 through which headed screws 15 pass for holding the bracket against an appropriately formed portion 16 of the saw guard, the slots permitting lateral adjustment of the bracket for a purpose which will be explained hereinafter.

Extending forwardly from and at right angles to the back-plate is a pair of generally parallel projections or bosses 17 provided with threaded openings 18 for the reception of a screw 19 by which the bosses may be moved towards each other when desired. In the confronting faces of the bosses and extending from top to bottom thereof (Fig. 4) are formed slide-ways 20 for the "kick-back" and splitter carrier 21 (Fig. 7). This carrier may be conveniently produced by arranging two similar flat bars 22 in spaced parallelism, and securing them in this relation as by welding to the front edges of the bars at top and bottom (referring to Fig. 7) blocks 23 and 24. Block 24 is provided with a through opening 25, and the bars may be provided with alined openings 26, one of them threaded, to receive a screw pin 27 which extends across the space between the bars 22.

As best seen in Fig. 5, the carrier 21 is of such size in cross-section that it fits snugly and is slidable within the slide-ways 20 of the bracket 11, two adjusted positions being shown in Figs. 1 and 6.

Slidable and adapted to be frictionally held between the carrier bars 22 is a splitter, comprising a stem portion 28 and a blade proper 29.

Movement of the splitter is guided by its contact with the back-plate 12 of the bracket and the blocks 23 and 24; and for the same purpose, and to provide a stop defining the limits of longitudinal movement of the splitter in the carrier in both directions, the stem portion thereof may be slotted, as at 30, to accommodate the stop-pin or screw 27. Movement of the carrier with respect to bracket 11 is limited by the blocks 23 and 24; and block 24, by reason of its aperture 25, serves also as a bearing block for the "kick-back" proper 31. This member is a dog or pawl-like piece, with a serrated edge for biting into wood under certain conditions, and with parallel apertured yoke arms 32 embracing between them the bearing block 24, a pin 33 passing through the apertures of the arms and the aperture 25 to complete the assembly, so that dog 31 may have pivotal movement relatively to the carrier 21 (compare Figs. 1 and 6). The dog is provided with an aperture 34 to engage over the upwardly and forwardly extending nose portions 17' of bracket 11, to hold the "kick-back" up and out of the way when the saw is used for example in cross-cutting (Fig. 6). In that case, the clamping screw 19 is loosened, releasing the holding pressure of the bosses 17 on the carrier 21 and the latter is moved to the limit of upward movement permitted by the contact of block 24 with the under face of the bracket, whereupon the dog is moved pivotally so that its opening 34 may pass over the nose-pieces 17'; then, as the carrier is allowed to drop slightly, the dog is retained in the Fig. 6 position. The splitter is independently moved up to the Fig. 6 position, and both splitter and carrier held in the position of that figure by manipulation of set-screw 19 with consequent pressure reactions between bosses 17, carrier-bars 22, and splitter stem 30.

When adjustments are to be made for rip-sawing (Fig. 1), the parts are brought to proper positions in view of the thickness of the lumber that is to be cut, and fixed in such positions by means of the clamping screw. Lateral adjustment, so that the splitter blade may surely be in alinement with the saw, is permitted by the slots 14 of the bracket.

Block 23 serves as a convenient finger piece for manipulating the carrier and of course it must be welded in place after the carrier is assembled with the bracket. It may however be dispensed with, or removably connected to the carrier bars.

In Fig. 1 the lumber being cut is indicated at 35, the arrow thereon showing the direction in which it is pushed lengthwise of the table under the saw; and the teeth of the dog are shown as they would dig into and prevent reverse travel of the lumber in case for any reason the saw should take hold of it and tend to give it such reverse movement. In cross-cutting (Fig. 6) the wood is ordinarily held stationary with respect to the table, and the saw moves transversely over it.

It will be apparent that modifications can be made over the showing of the attached drawings, in view of which any limitations imposed upon the invention are to be such only as are set forth in the following claims.

I claim:

1. In a device of the kind described, including a saw and a saw guard, a kick-back secured to said guard for sliding and pivotal movement relative to the guard, means for holding said kick-back in any of its positions determined by sliding movement thereof, and a member engaging said kick-back in a position determined by relative sliding and pivotal movement between the member and the kick-back, said member locking said kick-back against pivotal movement from such position.

2. In a device of the kind described, including a saw and a saw guard, a carrier secured to said guard for sliding movement relative to the guard, a kick-back pivotally secured to said carrier, means for holding said carrier in any of its positions determined by sliding movement thereof, and a member engaging said kick-back in a position determined by relative sliding and pivotal movement between the member and the kick-back, said member locking said kick-back against pivotal movement from such position.

3. In a device of the kind described, including a saw and a saw guard, a carrier secured to said guard for sliding movement relative to the guard, a kick-back pivotally secured to said carrier, a splitter slidably mounted in said carrier, means for holding said kick-back and said splitter in any of their positions determined by sliding movement thereof, and a member engaging said kick-back in a position determined by relative sliding and pivotal movement between the member and the kick-back, said member locking said kick-back against pivotal movement from such position.

4. In a device of the kind described, including a saw and a saw guard, a bracket detachably secured to said guard for lateral adjustment relative thereto, a carrier secured to said bracket for sliding movement relative to the bracket, a kick-back pivotally secured to said carrier, means for holding said carrier in any of its positions determined by sliding movement thereof, and a member engaging said kick-back in a position determined by relative sliding and pivotal movement between the member and the kick-back, said member locking said kick-back against pivotal movement from such position.

5. In a device of the kind described, including a saw and a saw guard, a kick-back secured to said guard for sliding and pivotal movement relative thereto, a splitter secured to said guard for sliding movement relative to said guard and to said kick-back, and means for simultaneously locking said splitter against movement and locking said kick-back against sliding movement.

6. In a device of the kind described, including a saw and a saw guard, a kick-back secured to said guard for sliding and pivotal movement relative thereto, a splitter secured to said guard for sliding movement relative to said guard and to said kick-back, means for simultaneously locking said splitter against movement and locking said kick-back against sliding movement, and a member engaging said kick-back in a position determined by relative sliding and pivotal movement between the member and the kick-back, said member locking said kick-back against pivotal movement from such position.

7. In a device of the kind described, including a saw and a saw guard, a carrier secured to said guard for sliding movement relative thereto, a kick-back pivotally secured to said carrier, said carrier forming a slideway, a splitter mounted in said slideway for sliding movement relative to said carrier and to said kick-back, and single means for simultaneously locking said splitter against movement and locking said kick-back against sliding movement.

8. In a device of the kind described, including a saw and a saw guard, a carrier secured to said guard for sliding movement relative thereto, a kick-back pivotally secured to said carrier, said carrier forming a slideway, a splitter mounted in said slideway for sliding movement relative to said carrier and to said kick-back, single means for simultaneously locking said splitter against movement and locking said kick-back against sliding movement, and means for holding said kick-back against pivotal movement in one extreme position thereof.

9. In a device of the kind described, including a saw and a saw guard, a bracket detachably secured to said guard and adjustable laterally of the guard, a kick-back mounted for bodily straight-line and pivotal movement relative to the bracket, means for holding the kick-back in various of the positions to which it may be adjusted by straight-line movement, said bracket having a projecting portion, and said kick-back having an opening adapted to pass over and be held in one of its pivotal positions by said projecting portion.

WALLACE W. GARDNER.